US012793119B2

(12) United States Patent
Zou

(10) Patent No.: US 12,793,119 B2
(45) Date of Patent: Nov. 10, 2026

(54) PAYMENT METHODS, NON-TRANSITORY COMPUTER-READABLE MEDIUM, AND SYSTEMS

(71) Applicant: Alipay.com Co., Ltd., Shanghai (CN)

(72) Inventor: Shengqun Zou, Shanghai (CN)

(73) Assignee: Alipay.com Co., Ltd., Shanghai (CN)

( * ) Notice: Subject to any disclaimer, the term of this patent is extended or adjusted under 35 U.S.C. 154(b) by 312 days.

(21) Appl. No.: 18/396,261

(22) Filed: Dec. 26, 2023

(65) Prior Publication Data

US 2024/0127317 A1 Apr. 18, 2024

Related U.S. Application Data

(63) Continuation of application No. PCT/CN2022/104336, filed on Jul. 7, 2022.

(30) Foreign Application Priority Data

Sep. 8, 2021 (CN) ........................ 202111051331.4

(51) Int. Cl.
*G06Q 30/00* (2023.01)
*G06Q 20/32* (2012.01)
*G06Q 30/0601* (2023.01)

(52) U.S. Cl.
CPC ..... *G06Q 30/0635* (2013.01); *G06Q 20/3276* (2013.01)

(58) Field of Classification Search
CPC ........... G06Q 30/0635; G06Q 30/0633; G06Q 30/06331; G06Q 30/06332;
(Continued)

(56) References Cited

U.S. PATENT DOCUMENTS 9,679,288 B2 * 6/2017 Biswas ................ G06Q 10/087
9,875,469 B1 * 1/2018 Chin .................. G06Q 20/3276
(Continued)

FOREIGN PATENT DOCUMENTS

CN 104616141 5/2015
CN 106845951 6/2017
(Continued)

OTHER PUBLICATIONS

G. Dutka and A. Guzik, "The role of devices and their functionalities in creating social shopping contexts," 2018 II National Interdisciplinary Scientific Conference TechSpo'18: Power of Algorithms, Krakow, Poland, 2018, pp. 1-7, doi: 10.1109/TechSpo.2018.8584623. (Year: 2018).*
(Continued)

*Primary Examiner* — Arielle E Weiner
(74) *Attorney, Agent, or Firm* — Fish & Richardson P.C.

(57) ABSTRACT

Implementations of this specification disclose payment computer-implemented methods, computer-implemented systems, and non-transitory, computer-readable media. A computer-implemented method includes a payment instruction sent by a first user by scanning an order QR code is received, where the order QR code is generated based on a first order corresponding to a target product, and the first order is generated based on a purchase operation performed by a second user for the target product. The first order is set to an occupied state, where a payment instruction of a user other than the first user is rejected to be executed when the first order is in the occupied state. A second order of the first user is created based on an order identifier of the first order in the occupied state. A payment operation is performed based on the second order.

20 Claims, 7 Drawing Sheets

(58) Field of Classification Search
CPC ....... G06Q 30/06333; G06Q 30/06334; G06Q 30/0637; G06Q 10/083; G06Q 10/087; G06Q 20/3276
See application file for complete search history.

(56) References Cited

U.S. PATENT DOCUMENTS

| | | | | |
|---|---|---|---|---|
| 11,176,240 | B1* | 11/2021 | Miles | G06F 21/6218 |
| 11,449,490 | B1* | 9/2022 | Vig | G06F 16/2343 |
| 2005/0044030 | A1 | 2/2005 | Lockley et al. | |
| 2012/0238367 | A1* | 9/2012 | Kido | A63F 13/75 463/43 |
| 2013/0275240 | A1 | 10/2013 | Ramaratnam et al. | |
| 2019/0034393 | A1 | 1/2019 | Rose | |
| 2019/0279181 | A1 | 9/2019 | Kelly et al. | |
| 2020/0160296 | A1* | 5/2020 | Park | G06Q 20/3223 |
| 2022/0343398 | A1* | 10/2022 | Han | G06Q 30/0635 |
| 2022/0374846 | A1* | 11/2022 | Burnam | G06Q 20/06 |
| 2023/0067467 | A1* | 3/2023 | Bantanur | G06Q 20/102 |

FOREIGN PATENT DOCUMENTS

| | | |
|---|---|---|
| CN | 107818457 A | 3/2018 |
| CN | 109447723 | 3/2019 |
| CN | 109978522 | 7/2019 |
| CN | 110517026 | 11/2019 |
| CN | 112184376 A | 1/2021 |
| CN | 112766956 | 5/2021 |
| CN | 113837742 | 12/2021 |
| EP | 3144876 | 3/2017 |
| JP | 2005-141712 | 6/2005 |
| WO | WO 2023/035753 | 3/2023 |

OTHER PUBLICATIONS

European Search Report in European Appln. No. 22866228.4, mailed on Jul. 17, 2024, 8 pages.

International Preliminary Report on Patentability in International Appln. No. PCT/CN2022/104336, mailed on Mar. 21, 2024, 12 pages (with English translation).

International Search Report and Written Opinion in International Appln. No. PCT/CN2022/104336, mailed on Sep. 20, 2022, 15 pages (with English translation).

Auh et al., "Assessing the Feasibility of an Alternative Payment Model for Mohs Micrographic Surgery at an Academic Center," Dermatologic Surgery, Jun. 2020, 46(6):735-741.

Chen, "Discussion of third-party payment model," Financial Computer of Huanan, Jan. 10, 2006, (01):9-12, 6 pages (with English abstract).

* cited by examiner

PAYMENT METHODS, NON-TRANSITORY COMPUTER-READABLE MEDIUM, AND SYSTEMS

CROSS-REFERENCE TO RELATED APPLICATIONS

This application is a continuation of PCT Application No. PCT/CN2022/104336, filed on Jul. 7, 2022, which claims priority to Chinese Application No. 202111051331.4, filed Sep. 8, 2021, all of which is hereby incorporated by reference in their entireties.

TECHNICAL FIELD

One or more embodiments of this specification relate to the field of internet of things technologies, and in particular, to payment methods and apparatuses, electronic devices, and readable media.

BACKGROUND

Currently, after a target user purchases a product, an order QR code can be generated. The target user can scan the order QR code to pay for an order of the product.

If a target user cannot perform payment for various reasons when purchasing a product, the target user can send an order QR code corresponding to an order of the product to another user. The other user performs payment on behalf of the target user by scanning the order QR code.

In this case, if there are a plurality of other users, it is possible that the plurality of other users duplicately pay for the order. Other users that perform duplicate payments need to perform refund processes after a system completes processing of the order. Alternatively, when the order fails to be paid for by the first user that completes payment, the target user needs to perform a refresh operation. After the system refreshes the order QR code, another user can then perform payment by using a new order QR code.

It can be seen that in existing payment methods, when users make third-party payments on behalf of others, the QR code of the order cannot be reused until the order is successfully paid for, and the QR code of the order cannot prevent duplicate payments.

SUMMARY

One or more embodiments of this specification provide payment methods and apparatuses, electronic devices, and readable media. When another user needs to pay for an order on behalf of a target user, a payment method is provided that allows the QR code of the order to be reused until the order is successfully paid for, while avoiding duplicate payments. This helps reduce system pressure and improve user experience.

To implement the above-mentioned objective, one or more embodiments of this specification provide a payment method, including the following: A payment instruction sent by a first user by scanning an order QR code is received, where the order QR code is generated based on a first order corresponding to a target product, and the first order is generated based on a purchase operation performed by a second user for the target product; the first order is set to an occupied state, where a payment instruction of a user other than the first user is rejected to be executed when the first order is in the occupied state; a second order of the first user is created based on an order identifier of the first order in the occupied state; and a payment operation is performed based on the second order.

One or more embodiments of this specification further provide a payment apparatus, including: a receiving module, configured to receive a payment instruction sent by a first user by scanning an order QR code, where the order QR code is a QR code generated based on a first order corresponding to a target product, and the first order is generated based on a purchase operation performed by a second user for the target product; a setting module, configured to set the first order to an occupied state, where a payment instruction of a user other than the first user is rejected to be executed when the first order is in the occupied state; a creation module, configured to create a second order of the first user based on an order identifier of the first order in the occupied state; and a third-party payment module, configured to perform a payment operation based on the second order.

The payment methods, apparatuses, electronic devices, and readable media provided in the one or more embodiments of this specification have at least the following beneficial effects: In the embodiments of this specification, first, a payment instruction sent by a first user by scanning an order QR code is received, where the order QR code is generated based on a first order corresponding to a target product, and the first order is generated based on a purchase operation performed by a second user for the target product; then, the first order is set to an occupied state, where a payment instruction of a user other than the first user is rejected to be executed when the first order is in the occupied state; then, a second order of the first user is created based on an order identifier of the first order in the occupied state; and finally, a payment operation is performed based on the second order. It can be seen that in the embodiments of this specification, after the payment instruction is received, the order is locked, so that another user cannot pay for the first order when the first user pays for the first order. In addition, because the payment operation is performed based on the second order created based on the first order, the first order is not directly processed, and even if the first user fails to perform payment, only the second order is affected, and the first order is not affected, so that the order QR code can be further reused, thereby achieving technical effects of preventing duplicate payments while ensuring that the order QR code can be reused before the first order of the target product is successfully paid for.

BRIEF DESCRIPTION OF DRAWINGS

To describe the technical solutions in the embodiments of this specification or in the existing technology more clearly, the following briefly describes the accompanying drawings needed for describing the embodiments or the existing technology. Clearly, the accompanying drawings in the following descriptions merely show some embodiments of this specification, and a person of ordinary skill in the art can still derive other drawings from these accompanying drawings without creative efforts.

DESCRIPTION OF EMBODIMENTS

Figure 1:
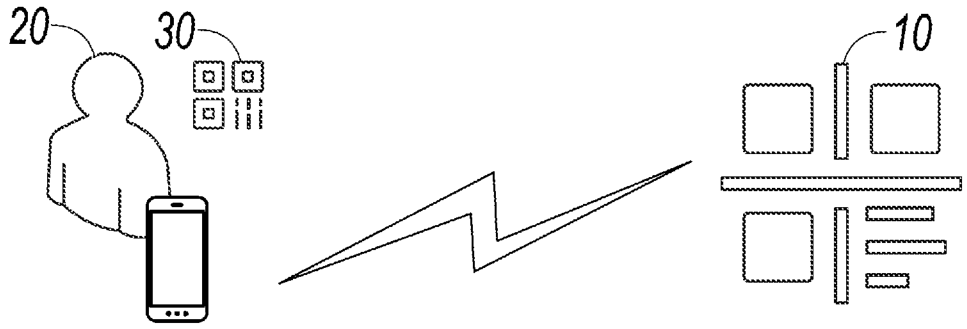
FIG. 1 is a schematic diagram illustrating a structure of a system of a payment method according to one or more embodiments of this specification.

To make the objectives, technical solutions, and advantages of one or more embodiments of this specification clearer, the following clearly and comprehensively describes the technical solutions in one or more embodiments of this specification with reference to specific embodiments of this specification and the corresponding accompanying drawings. Clearly, the described embodiments are merely some but not all of embodiments of this specification. All other embodiments obtained by a person of ordinary skill in the art based on embodiments of this specification without creative efforts shall fall within the protection scope of one or more embodiments of this specification.

The following describes in detail the technical solutions provided in the embodiments of this specification with reference to the accompanying drawings.

In the existing technology, when a buyer purchases a product, for example, shops online or performs consumption in a brick-and-mortar store, a related system, for example, a payment system or a code platform, can generate an order QR code based on an order of the product after determining that the buyer purchases the product. The order QR code is a form of QR code, and can include an amount and product information. When the order QR code is scanned to perform a payment operation, the order can be paid for without requesting a user to enter the amount. When the buyer needs third-party payment, the buyer can forward the order QR code to another user. The other user scans the order QR code to perform third-party payment.

For example, the order QR code is sent to a group chat, so that other users in the group chat can perform third-party payment. In this case, in the group chat, if payment time of user A is too long and user B also performs payment, it is possible that user A also successfully performs payment after user B successfully performs payment, that is, the order of the product is duplicately paid for.

Currently, in case of duplicate payments, the payment system needs to initiate a refund operation for user A or user B when performing unified settlement. Therefore, the payment system needs to perform an extra process, and further needs to determine a refund target user, resulting in a waste of system resources. In addition, because both user A and user B successfully perform payments, it is possible that both user A and user B initiate refund applications. It further needs manual coordination to complete accurate refunding. Clearly, duplicate payments bring extra overheads to the system and increases labor costs, and user experience is very poor.

In addition, if a payment operation of user A is earlier than a payment operation of another user but fails to perform payment due to an insufficient balance or another factor, because the transaction is unique, in this case, the order QR code corresponding to the order of the product becomes invalid. When another user wants to perform third-party payment, the other user cannot continue to use the order QR code to complete payment. Therefore, the buyer needs to actively refresh the order QR code and then send a new order QR code to the third-party payer. Generation of the new order QR code brings extra overheads to the related system, for example, the payment system or the code platform, and the order QR code used to pay for the order of the product cannot be duplicately used.

In view of this, a payment method should be provided, so that duplicate payments can be further prevented while an order QR code can be duplicately used, to reduce system overheads, reduce extra user operations, and improve user experience.

FIG. 1 is a schematic diagram illustrating a structure of a system of a payment method according to one or more embodiments of this specification.

User 20 can establish a communication connection to code platform 10 by scanning order QR code 30. Certainly, there can be a plurality of users 20, and code platform 10 can be further connected to a unified payment system. The unified payment system can be a system that can perform payment by using a plurality of payment platforms.

Figure 2:
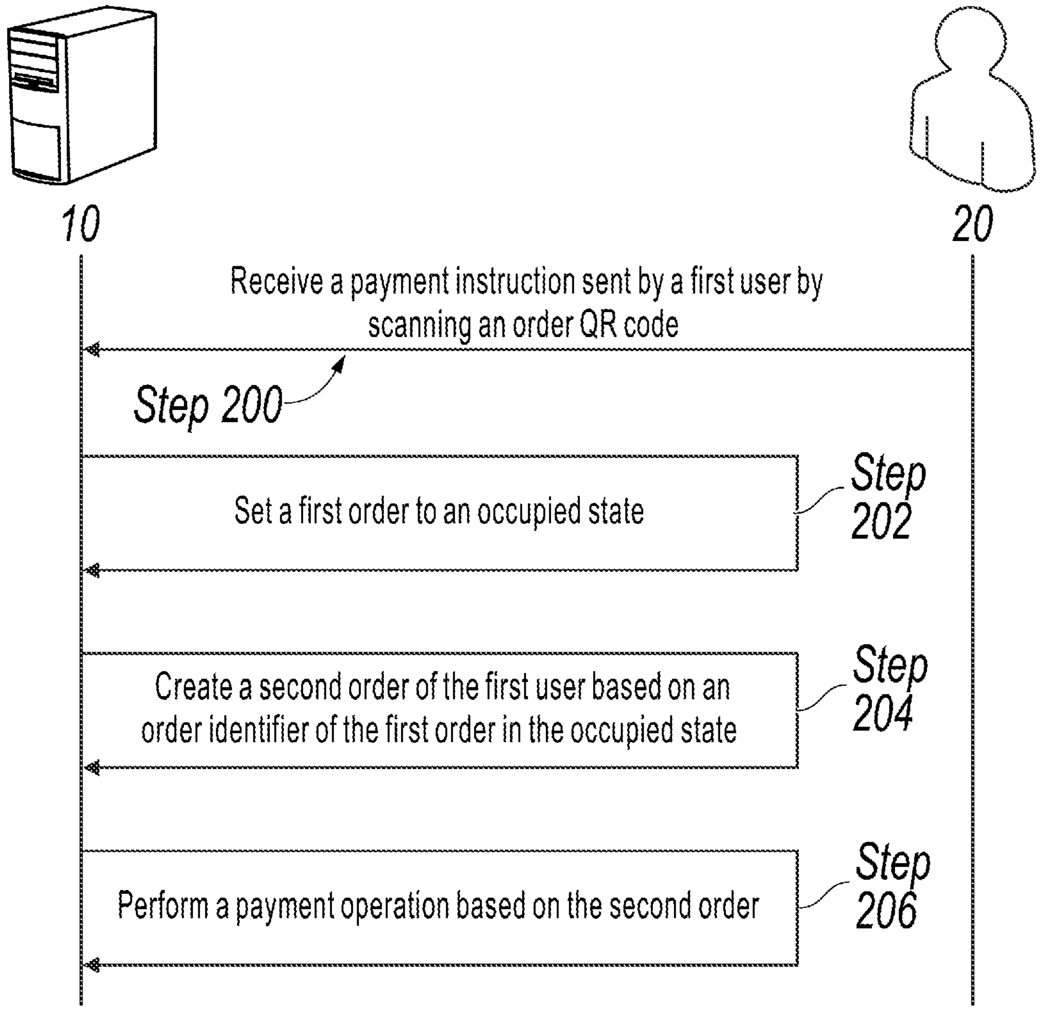
FIG. 2 is a schematic flowchart illustrating a payment method according to one or more embodiments of this specification.

FIG. 2 is a schematic flowchart illustrating a payment method according to one or more embodiments of this specification.

As shown in FIG. 2, the payment method provided in the one or more embodiments of this specification can include the following steps.

Step 200: Receive a payment instruction sent by a first user by scanning an order QR code. The order QR code is generated based on a first order corresponding to a target product, and the first order is generated based on a purchase operation performed by a second user for the target product. In the one or more embodiments of this specification, the order QR code can correspond to the first order. When the purchase operation performed by the second user for the target product is obtained, a process of generating the first order based on the target product and generating the order QR code corresponding to the first order based on the first order is triggered. The second user can purchase the target product online, for example, by logging in to a shopping website by using a browser, or certainly, can purchase the target product offline, for example, in a self-service purchase method. It can be understood that the target product can be a physical product such as an electronic device, furniture, a home appliance, a daily article, or fuel, or can be a virtual product such as a game card, a prop, equipment, or a value-added service. Implementations are not limited here, provided that the order QR code can be generated based on the first order after the first order is generated based on the target product.

In some embodiments, the order QR code is generated by a code platform, and the code platform can be a part of a payment system, or can be a separate platform system.

The order QR code can include information about the target product, an amount of the target product, an order number of the order corresponding to the target product, etc. Specific included information can be set based on an actual need.

The first user can scan the order QR code by using applications of different payment platforms, to implement third-party payment for the second user. Certainly, if the order QR code is scanned by using different applications, payment platforms corresponding to the applications can also be different.

Step 202: Set the first order to an occupied state. A payment instruction of a user other than the first user is rejected to be executed when the first order is in the occupied state. In the one or more embodiments of this specification, after the payment instruction is received, the first order can be set to the occupied state. Only an occupant can perform a payment operation on the first order in the occupied state, and a payment instruction of a user other than the first user is rejected to be executed when the first order is in the occupied state. For example, after the first user locks the first order, only the first user can perform a payment operation on the first order in a locking process. In this case, if another user, for example, a third user, attempts to pay for the first order, because the first order is in the occupied state, a payment operation of the third user is not performed.

In the one or more embodiments of this specification, the order can be set to the occupied state by locking a data row in a database or by setting a parameter, for example, setting a non-occupiable time point.

In the one or more embodiments of this specification, the setting the first order to an occupied state includes: locking a data row, in a database, that the first order is located in.

The setting the first order to an occupied state includes: setting a non-occupiable time point to a sum of a current time point and a predetermined non-occupiable time parameter.

In the one or more embodiments of this specification, the setting the first order to an occupied state can include at least two different methods.

In some embodiments, the data row, in the database, that the first order is located in can be locked. For example, the data row can be locked by using a database row lock. The database row lock allows only one user to perform an operation at one time. When the first user obtains the database row lock to lock the data row, other users cannot obtain the database row lock and cannot perform a data row locking operation, that is, cannot implement an operation of setting the first order to the occupied state. This approach can achieve exclusivity, especially in situations with a high level of concurrency and very short time intervals between operations.

For example, in the third-party payment scenario in the one or more embodiments of this application, the first user and the third user separately obtain the database row lock at an interval of 50 ms, to lock the data row of the first order in the database, to complete the operation of setting the first order to the occupied state. Because the first user sends the payment instruction at a time point earlier than the third user sends the payment instruction, when the third user attempts to obtain the database row lock, the third user is made to wait, or error information can be directly returned to block the payment operation of the third user.

In this method, the database needs to be occupied. However, because response time of the database is short, locking can be performed provided that the database row lock is not used, without use of other settings or algorithms or a worry about a network fluctuation problem.

Another implementation is setting the non-occupiable time point instead of occupying the database. The non-occupiable time point is used to represent a time point that a payment instruction of a user other than the first user can be executed at. The non-occupiable time point indicates that currently, it is possible that another user sets occupation time and is performing a payment operation. For example, the non-occupiable time point is null or zero by default. When a time point that the payment instruction sent by the first user is received at is not earlier than the non-occupiable time point, the non-occupiable time point can be set to the sum of the current time point and the predetermined non-occupiable time parameter. For example, if the current time point is 12:00:00, and the predetermined non-occupiable time parameter is 2 seconds, the non-occupiable time point is set to 12:00:02. The non-occupiable time parameter can be set based on an actual need. The predetermined non-occupiable time parameter can be used to represent duration for processing a payment instruction. Certainly, the predetermined non-occupiable time parameter can be set with reference to use duration of the database row lock, can be set based on actual duration, or can be updated based on a subsequent need.

In the method of setting the non-occupiable time point, the database does not need to be occupied, so that resources of the database can be saved. However, because an algorithm operation needs to be performed for parameter setting, it is possible that setting fails due to network fluctuation. However, setting can be accelerated with constant improvement of hardware performance and network performance, to prevent a setting failure.

In the one or more embodiments of this specification, regardless of a method, the order can be set to the occupied state, so that another user cannot perform a payment operation, to make a data preparation for preventing duplicate payments.

Step 204: Create a second order of the first user based on an order identifier of the first order in the occupied state. In the one or more embodiments of this specification, the second order of the first user can be created based on the order identifier of the first order that is set to the occupied state. The order identifier can be obtained by matching an order code in the payment instruction, and the order code can enable the first user, the first order, and the second order to have an association relationship.

In the one or more embodiments of this specification, different users can correspond to different second orders. The first order can correspond to a plurality of second orders. Even if the second order fails to be paid for or an error occurs, a status of the first order is not affected. Therefore, a status of the order QR code corresponding to the first order is not affected, so that the order QR code can be duplicately used before payment of the first order is completed, and the order QR code corresponding to the first order does not need to be actively or passively refreshed.

After the second order is created, a data table of the second order can be correspondingly created in the database. A data table of the first order can correspond to data tables of a plurality of second orders. The data table of the first order and the data table of the second order have an association relationship, for example, have a same order code. Each second order can correspond to a different user identifier to distinguish between different users. Certainly, the data table of the second order can further have other information related to the first order and the user. Specific implementations are not limited here.

Step 206: Perform a payment operation based on the second order.

In the one or more embodiments of this specification, when the second order is generated, the payment operation can be performed based on the second order, to complete a third-party payment operation performed by the first user for the second user.

In the one or more embodiments of this specification, the payment operation can be completed based on the second order created based on the identifier of the first order in the occupied state. When the first order is in the occupied state, even if the second order fails to be paid for, the order QR code corresponding to the first order can be duplicately used. In addition, because only one user can successfully pay for the first order in the occupied state, duplicate payments can be prevented while it is ensured that the order QR code can be duplicately used.

In the above-mentioned one or more embodiments, the process of setting the first order to the occupied state is described. In the one or more embodiments of this specification, before the first order is set to the occupied state, it can be further determined whether the first order is in the occupied state.

Figure 3:
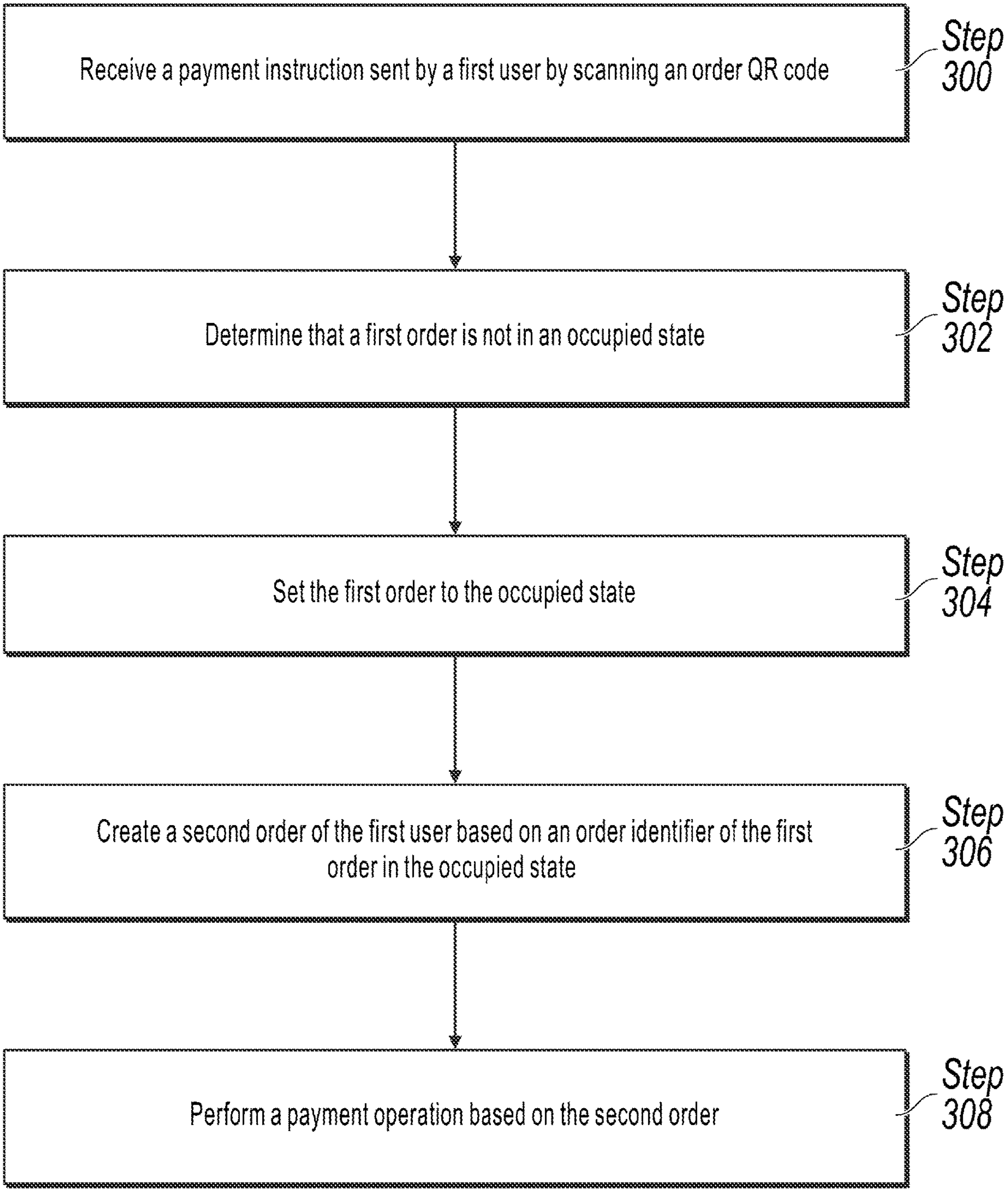
FIG. 3 is another schematic flowchart illustrating a payment method according to one or more embodiments of this specification.

FIG. 3 is another schematic flowchart illustrating a payment method according to one or more embodiments of this specification.

On the basis of the above-mentioned one or more embodiments, before the setting the first order to an occupied state in step 202, the method further includes the following step.

Step 300: Receive a payment instruction sent by a first user by scanning an order QR code.

Step 302: Determine whether a first order is in an occupied state. Step 304 is performed if it is determined that the first order is not in the occupied state.

Step 304: Set the first order to the occupied state.

Step 306: Create a second order of the first user based on an order identifier of the first order in the occupied state.

Step 308: Perform a payment operation based on the second order.

For step 300, step 304, step 306, and step 308, references can be made to step 200, step 202, step 204, and step 206 described in the above-mentioned one or more embodiments, and details are omitted here for simplicity.

The determining whether the first order is in an occupied state can specifically include: determining whether a data row, in a database, that the first order is located in is locked; and determining that the first order is not in the occupied state if it is determined that the data row is not locked.

The determining whether the first order is in an occupied state can specifically include: determining whether a current time point is earlier than a non-occupiable time point, where the non-occupiable time point is used to represent a time point that is set when a payment instruction is received at a previous time; and determining that the first order is not in the occupied state if it is determined that the current time point is not earlier than the non-occupiable time point.

In the one or more embodiments of this specification, the determining whether the first order is in an occupied state can be determining whether the data row, in the database, that the first order is located in is locked, or can be determining whether the current time point is earlier than the non-occupiable time point.

In the one or more embodiments of this specification, the non-occupiable time point is the time point that is set when the payment instruction is received at the previous time. It can be seen from the above-mentioned one or more embodiments that the non-occupiable time point can be set based on a receiving time point of the payment instruction when the payment instruction is received at the previous time, to indicate that a user occupies the first order and is performing a payment operation on the first order.

In the one or more embodiments of this specification, if the data row is locked, that is, a database row lock has been obtained by a user, it means that the user is performing a payment operation on the first order. Therefore, it should be determined that the first order is in the occupied state. Otherwise, if the data row in the database is not locked, it is determined that the first order is not in the occupied state, and a subsequent operation can be performed.

In the one or more embodiments of this specification, before the first order is set to the occupied state, it can be determined whether the first order has been set to the occupied state, and the first order can be set to the occupied state if the first order has not been set to the occupied state.

In the one or more embodiments of this specification, prompt information indicating that the first order is being processed is sent to the first user if it is determined that the first order is in the occupied state.

In the one or more embodiments of this specification, if the first order is in the occupied state, the prompt information indicating that the first order is being processed, for example, prompt information "being processed", can be sent to the first user, and a subsequent operation process of paying for the first order can be prevented.

In the one or more embodiments of this specification, the determining that the first order is in the occupied state can specifically include: determining whether the data row, in the database, that the first order is located in is locked after a predetermined waiting time interval if it is determined that the data row is locked; and determining that the first order is in the occupied state if the data row, in the database, that the first order is located in is locked after the predetermined waiting time interval.

In the one or more embodiments of this specification, if the first order is in the occupied state, it is also possible to wait for a predefined time interval. The predetermined time interval can be set based on an actual need, for example, 2 seconds. The predetermined time interval can be a time period that is calculated after the payment instruction is received and that is occupied by generating a payment code corresponding to the second order and then sending the payment code to a unified payment platform, and receiving a message, for example, an acceptance message, returned by the unified payment platform. The predetermined time interval can be adjusted based on an actual need.

If the data row is still locked after the wait for the predetermined time interval, it means that it is possible that payment processing of a previous user is not completed due to a system problem or network fluctuation, and it is determined that the first order is still in the occupied state.

In the one or more embodiments of this specification, to further avoid duplicate payments, it can be further determined whether the current time point is earlier than a non-payable time point.

Figure 4:
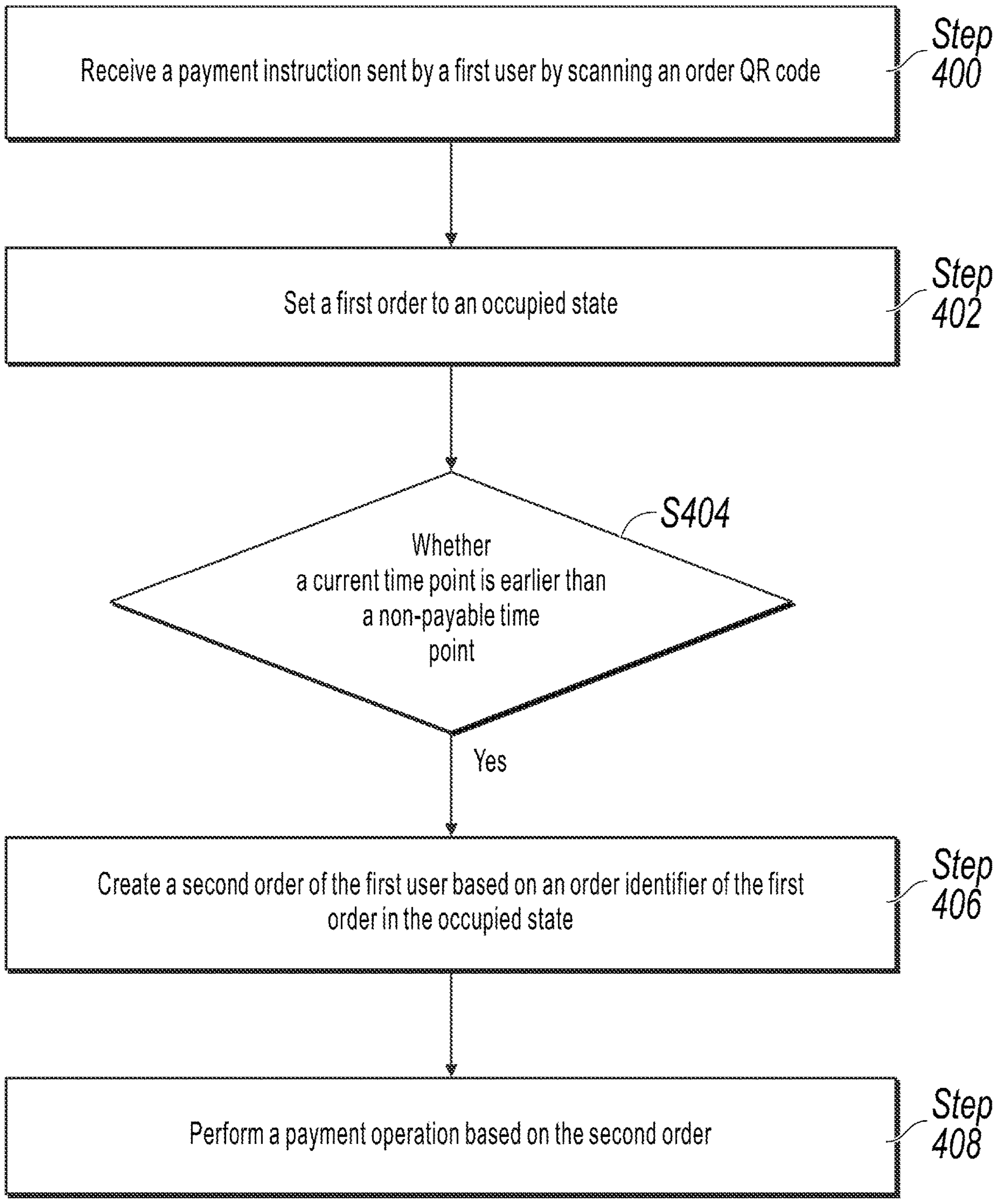
FIG. 4 is still another schematic flowchart illustrating a payment method according to one or more embodiments of this specification.

FIG. 4 is still another schematic flowchart illustrating a payment method according to one or more embodiments of this specification.

Step 400: Receive a payment instruction sent by a first user by scanning an order QR code.

Step 402: Set a first order to an occupied state.

Step 404: Determine whether a current time point is earlier than a non-payable time point. Step 406 can be performed if the current time point is not earlier than the non-payable time point.

Step 406: Create a second order of the first user based on an order identifier of the first order in the occupied state.

Step 408: Perform a payment operation based on the second order.

In the one or more embodiments of this specification, for step 400, step 402, step 406, and step 408, references can be respectively made to step 200, step 202, step 204, and step 206 in the above-mentioned one or more embodiments, and details are omitted here for simplicity.

In the one or more embodiments of this specification, to further avoid duplicate payments, before the second order of the first user is created based on the order identifier of the first order in the occupied state, it can be further determined whether the current time point falls within a time period of a payment operation performed by another user.

In the one or more embodiments of this specification, step 404 can be a determining process performed after a database row lock is unlocked. Therefore, in step 404, before it is determined whether the current time point is earlier than the non-payable time point, it can be further determined whether a data row, in a database, corresponding to the first order at the current time point has been unlocked. Step 404 is performed if the data row has been unlocked. Otherwise, step 404 is performed after the data row is unlocked, or error prompt information, for example, prompt information "the order is being processed", is returned to the first user.

In the one or more embodiments of this specification, an extreme case in a payment process further needs to be considered. For example, after the first user locks the data row of the first order in the database, if the first order is being paid for by another user, for example, when a third user initiates a checkout process to perform a payment operation, in this case, although the data row of the first order in the database has been unlocked, that is, the database row lock has been released, the subsequent step of creating the second order should not be performed, and the second order can be created only when the current time point is not earlier than the non-payable time point.

It can be understood that a user cannot be in a payment state for long time. Therefore, the non-payable time point can also guarantee another user will be unable to perform payment when a user suspends a payment operation for long time.

Based on this, in the one or more embodiments of this specification, it can be further determined whether the current time point is earlier than the non-payable time point. In the one or more embodiments of this specification, the non-payable time point can be a time point after a predetermined payment time interval after a time point that the payment instruction is received at, or can be a time point after a predetermined payment time interval after a time point that a message, for example, an acceptance message, sent by a unified payment platform is received at. Certainly, the non-payable time point can be alternatively a time point after a predetermined payment time interval after a time point that step 404 is triggered at.

The non-payable time point can be set based on an actual need. For example, duration of a payment operation performed by a user from payment page redirecting to payment completion usually does not exceed 3 minutes. Therefore, the non-payable time point can be set to the third minute after the time point that the payment instruction is received at, so that the user can successfully perform the payment operation. For example, after 12:00, if the predetermined payment time interval is 3 minutes, the non-payable time point is 12:03.

Certainly, if the non-payable time point needs to be subsequently changed, the predetermined payment time interval can be further modified. For example, if the predetermined payment time interval is modified to 1 minute, the non-payable time point can be 12:01. That is, the non-payable time point in the one or more embodiments of this specification can be set and updated based on an actual need, and is a parameter that can reflect duration of a payment operation of a user.

In the one or more embodiments of this specification, it is determined that the first order is not in a payment process when it is determined that the current time point is not earlier than the non-payable time point. The process of step 406 can be performed.

It can be understood that step 404 can be alternatively a process performed before step 402, and an execution sequence of step 404 can be adjusted based on an actual need.

On the basis of the above-mentioned one or more embodiments, prompt information can be returned to the first user if it is determined that the first order is in the payment process.

In the one or more embodiments of this specification, the method further includes: determining that the first order is in the payment process if it is determined that the current time point is earlier than the non-payable time point; and sending, to the first user, prompt information indicating that the first order is being paid for.

In the one or more embodiments of this specification, if it is determined that the first order is in the payment process, that is, a second order corresponding to the first order is being processed by the unified payment platform, prompt information, for example, prompt information "the order is being paid for", can be sent to the first user, and a subsequent process can be interrupted, for example, the process of generating the second order of the first user is not performed.

In the one or more embodiments of this specification, to further avoid duplicate payments, it can be further determined whether the first order is in the payment process, and a prompt can be given to the user.

In the one or more embodiments of this specification, it can be further determined whether the first order is in a payable state, for example, whether the first order has been paid for.

Figure 5:
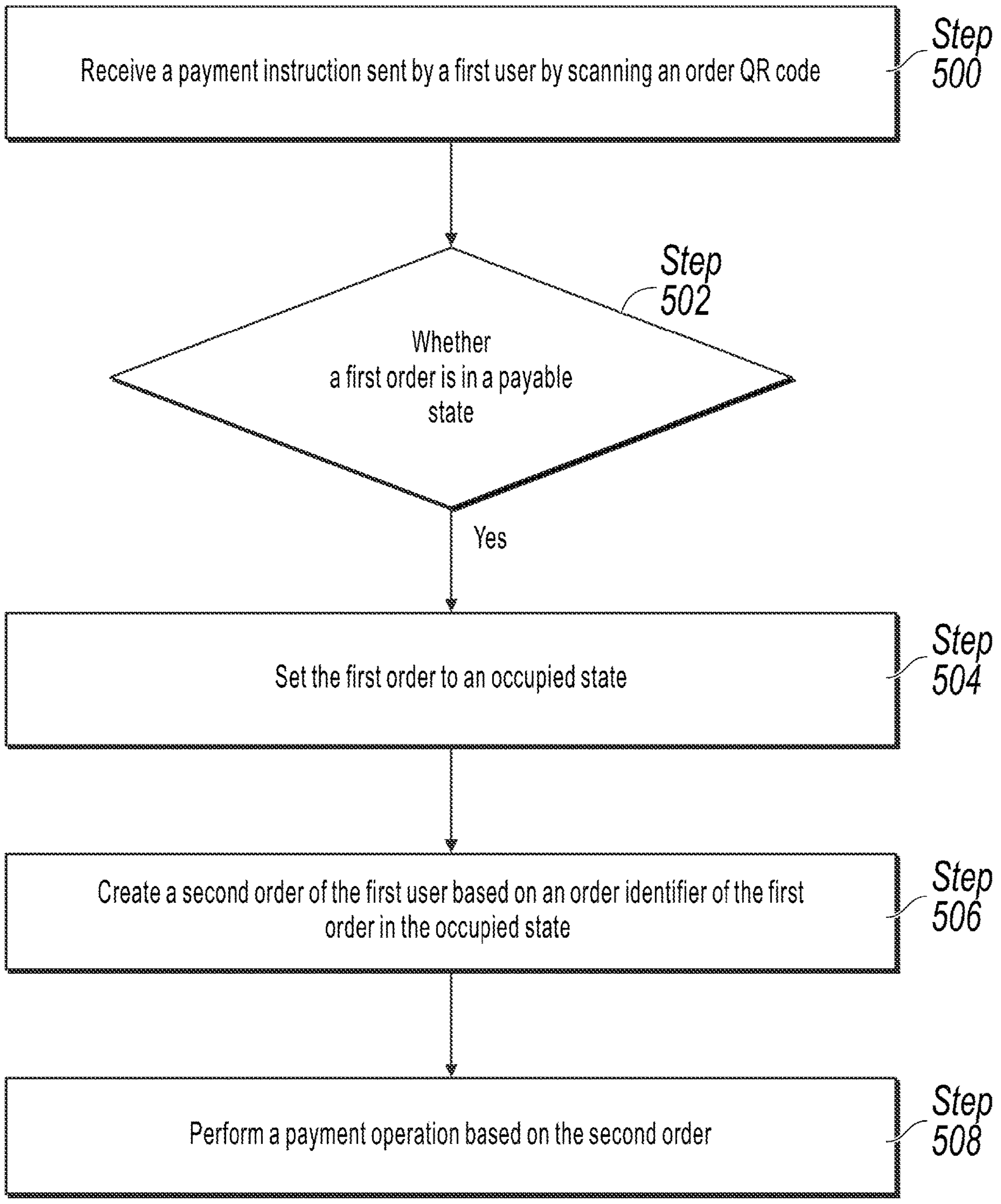
FIG. 5 is still another schematic flowchart illustrating a payment method according to one or more embodiments of this specification.

FIG. 5 is still another schematic flowchart illustrating a payment method according to one or more embodiments of this specification.

Step 500: Receive a payment instruction sent by a first user by scanning an order QR code.

Step 502: Determine whether a first order is in a payable state. Step 504 can be performed if the first order is in the payable state.

Step 504: Set the first order to an occupied state.

Step 506: Create a second order of the first user based on an order identifier of the first order in the occupied state.

Step 508: Perform a payment operation based on the second order.

The method further includes: sending, to the first user, a prompt message indicating that the first order has been paid for if it is determined that the first order is not in the payable state.

In the one or more embodiments of this specification, for step 500, step 504, step 506, and step 508, references can be made to step 200, step 202, step 204, and step 206 in the above-mentioned one or more embodiments, and details are omitted here for simplicity.

In the one or more embodiments of this specification, it can be further determined whether the first order is in the payable state. The payable state can indicate that a payment operation can be performed on the first order. It is determined that the first order is not in the payable state if it is determined that the first order has been paid for; or it is determined that the first order is in the payable state if it is determined that the first order is not paid for. The second order of the first user can be created based on the order identifier of the first order in the occupied state when the first order is in the payable state.

A prompt message indicating that the first order has been paid for is sent to the first user if it is determined that the first order is not in the payable state.

Prompt information “has been paid for” can be sent to the user when the first order has been paid for. For example, it can be determined, by using a field, in a data row that the first order is located in, indicating whether the first order is paid for, whether the first order has been paid for. Alternatively, it can be determined, by using an order status of the first order, whether the first order has been paid for. The order status can be an attribute parameter corresponding to the order, and it can be determined, by using the attribute parameter, whether the first order has been successfully paid for.

In the one or more embodiments of this specification, it is determined that the first order is not in the payable state if the first order has been paid for, and a subsequent payment process of step 504 to step 508 cannot be performed on the first order that is not in the payable state. The subsequent payment process of step 504 to step 508 can be performed on the first order in the payable state.

In the one or more embodiments of this specification, to save system resources, it can be further determined whether the first order is in the payable state.

Certainly, it can be alternatively determined, in the following method, whether the first order is in the payable state.

Before the creating a second order of the first user based on an order identifier of the first order in the occupied state, the method further includes: determining that the first order is in a payable state if it is determined that a transaction corresponding to the first order is in an unclosed state; or determining that the first order is not in the payable state if it is determined that the transaction corresponding to the first order is in a closed state.

The method further includes: sending, to the first user, a prompt message indicating that the first order cannot be paid for if it is determined that the first order is not in the payable state.

In the one or more embodiments of this specification, it means that the transaction of the first order is invalid if the transaction corresponding to the first order is in the closed state. For example, the transaction corresponding to the first order is in the closed state if a certain flash sale activity has expired. Alternatively, the transaction corresponding to the first order should also be in the closed state if the second user actively cancels the transaction for the first order. A transaction status change can be alternatively caused by other cases, and no enumeration is made here.

In the one or more embodiments of this specification, a prompt message “cannot be paid for”, for example, “the order cannot be paid for” or “the transaction of the order has been closed”, can be sent to the first user if it is determined that the transaction of the first order is in the closed state.

In the one or more embodiments of this specification, an execution sequence of step 502 can be set based on an actual need, to reduce unnecessary overheads of the system.

The above-mentioned one or more embodiments describe the process of performing the payment operation based on the second order. The following describes the process in detail.

Figure 6:
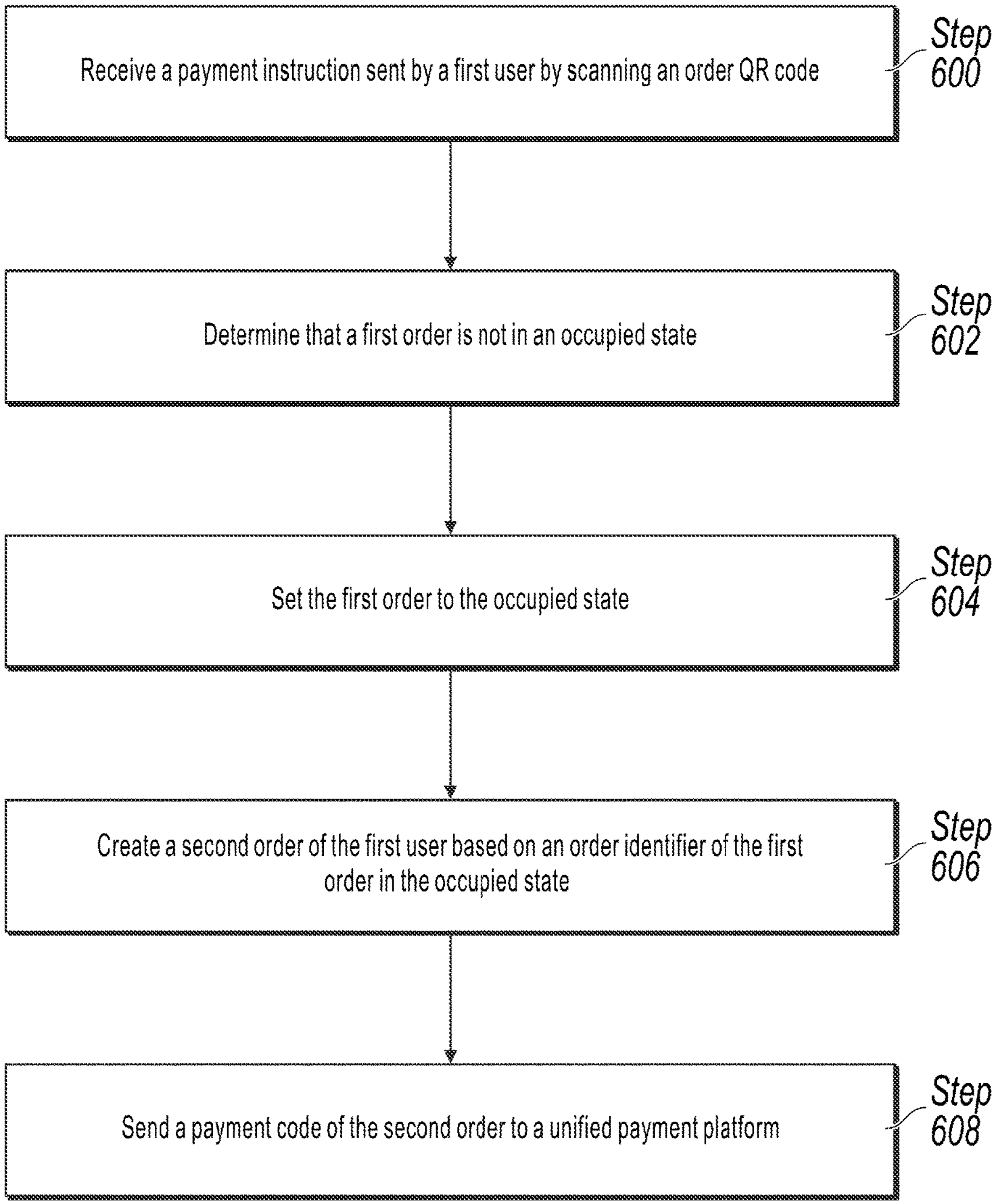
FIG. 6 is still another schematic flowchart illustrating a payment method according to one or more embodiments of this specification.

FIG. 6 is still another schematic flowchart illustrating a payment method according to one or more embodiments of this specification.

Step 600: Receive a payment instruction sent by a first user by scanning an order QR code.

Step 602: Set a first order to an occupied state.

Step 604: Create a second order of the first user based on an order identifier of the first order in the occupied state.

Step 606: Send a payment code of the second order to a unified payment platform. The unified payment platform can generate payment redirect page address information based on the payment code of the second order and payment platform information of an application used by the first user to scan the order QR code, and send the payment redirect page address information to the application, so that the first user performs the payment operation in a payment interface popped up by the application based on the payment redirect page address information.

In the one or more embodiments of this specification, for an execution process of step 600, step 602, and step 604, references can be made to the execution process of step 200, step 202, and step 204 in the above-mentioned one or more embodiments, and details are omitted here for simplicity.

In the one or more embodiments of this specification, payment operations of a plurality of payment platforms can be supported.

To implement payment operations of a plurality of payment platforms, in the one or more embodiments of this specification, the payment code of the second order can be sent to the unified payment platform. The payment code can be generated based on the second order, and can include related payment information such as an amount of a target product and an identifier of the first user.

After the payment code is sent to the unified payment platform, the unified payment platform can establish a communication connection to the application used by the first user to scan the order QR code, and generate a payment redirect page corresponding to a payment platform based on the platform information of the payment platform of the application, so that the first user performs the payment operation based on the payment redirect page address information by using the application, for example, initiates a checkout process, and then performs an operation, for example, enters a payment confirmation password, in a pop-up interface.

In the one or more embodiments of this specification, different payment redirect pages can be generated based on different payment platforms, to implement payment of different payment platforms.

Certainly, the function of the unified payment platform can be alternatively implemented as a module of an execution body in the one or more embodiments of this application.

In the one or more embodiments of this specification, the method can further include: receiving an acceptance message returned by the unified payment platform; and unlocking a data row, in a database, that the first order is located in.

In the one or more embodiments of this specification, the timing for unlocking the data row can be set to being after acceptance of the unified platform. Due to a limitation of the database, if a data row lock is occupied for long time, it is possible that problems such as slow database running, redundant operation logs, and database crash occur. Therefore, locking time should not be too long, for example, should be 3 seconds or 50 milliseconds. To ensure the payment operation on the first order, the data row can be unlocked after the unified platform receives the payment code.

In the one or more embodiments of this specification, the method can further include: updating a non-payable time point based on a predetermined payment time parameter after an acceptance message returned by a unified payment platform is received.

In the one or more embodiments of this specification, the non-payable time point can be updated when the acceptance message returned by the unified payment platform is received. The predetermined payment time parameter can be set with reference to the setting method of the predetermined payment time interval in the above-mentioned one or more embodiments. The predetermined payment time parameter can represent duration of a payment operation of a user for an order.

In the one or more embodiments of this specification, the method can further include: setting the first order to a paid state after it is determined that the first user successfully performs payment.

In the one or more embodiments of this specification, alternatively, a payment status of the unified payment platform can be asynchronously queried. If it is determined that the second order is successfully paid for, a payment status of the second order is modified to paid, and simultaneously the first order is set to the paid state, to complete payment of the first order. Certainly, alternatively, after payment is completed, the unified payment platform actively sends a payment result to the execution body, for example, a code platform, in this application, and then the execution body determines, based on the received payment result, whether the first user successfully performs payment.

In the one or more embodiments of this specification, the method can further include: obtaining a corresponding cancelation time point that the first user cancels the payment operation at if it is determined that the first user cancels the payment operation; and setting the non-payable time point to the cancelation time point if it is determined that the cancelation time point is earlier than the non-payable time point.

In the one or more embodiments of this specification, if the first user cancels the payment operation, to enable another user to perform a payment operation on the first order as soon as possible, the non-payable time point can be updated based on the cancelation time point that the first user cancels the payment operation at, so that another user can pay for the first order as soon as possible after the first user fails to perform payment.

Figure 7:
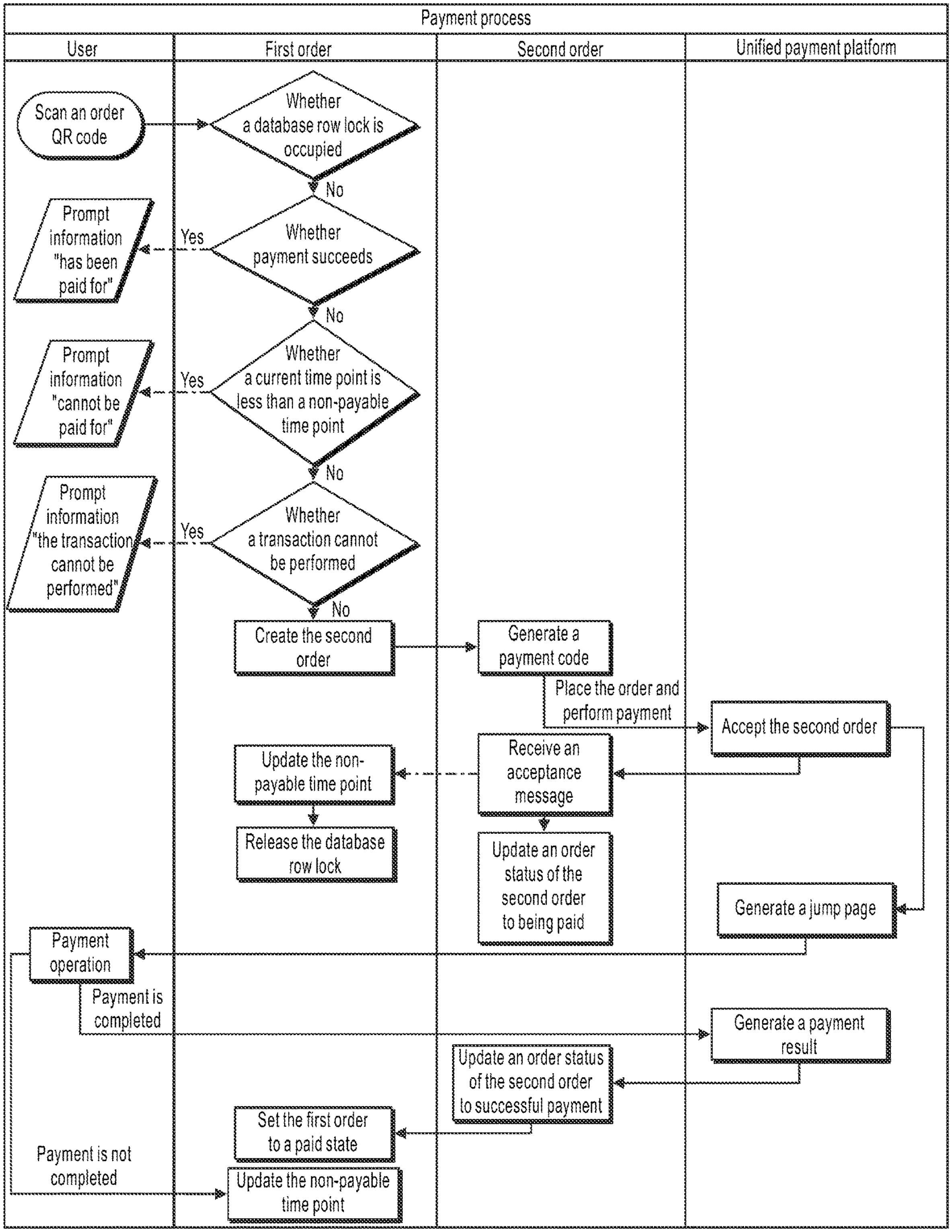
FIG. 7 is a lane diagram illustrating a payment method according to one or more embodiments of this specification.

FIG. 7 is a lane diagram illustrating a payment method according to one or more embodiments of this specification.

Referring to FIG. 7, based on the payment method provided in the embodiments of this application, in actual use, the following process can be included: An execution body, for example, a code platform, in the embodiments of this specification receives, at 10:00:00, a payment instruction, of a first order, sent by a first user by scanning an order QR code of a target product; obtains a database row lock, and locks an order row; creates a second payment order corresponding to the first order; generates a payment code of the second order, and sends the payment code to a unified payment platform; receives, at 10:00:30, an acceptance notification returned by the unified payment platform, and adjusts a non-payable time point to 10:02; and unlocks the order row.

The unified payment platform returns a payment redirect page address based on an application of the first user, and the first user performs a payment operation based on a redirected interface.

After payment succeeds, the unified payment platform saves a payment result. After it is determined that the payment result is that payment succeeds, a payment status of the second order is modified to paid, and a payment status of the first order is modified to paid. The first user completes payment.

If a payment instruction sent by a third user by scanning the order QR code is received at 10:01, and the database row lock of the first order cannot be obtained, prompt information "being paid for" is fed back to the third user.

The third user sends a payment instruction at 10:03. If it is determined that the data row of the first order is not locked, and further determined that the first order is in a paid state, a prompt message "the order has been paid for" is returned to the third user.

It can be seen that in the one or more embodiments of this specification, duplicate payments can be prevented while the order QR code can be duplicately used.

Figure 8:
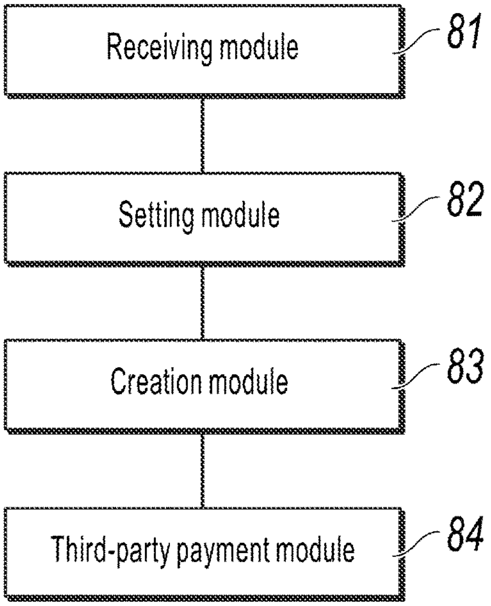
FIG. 8 is a schematic diagram illustrating a structure of a payment apparatus according to one or more embodiments of this specification.

Based on the same idea, the embodiments of this specification further provide an apparatus corresponding to the above-mentioned method. FIG. 8 is a schematic diagram illustrating a structure of a payment apparatus corresponding to FIG. 2 according to one or more embodiments of this specification.

As shown in FIG. 8, the payment apparatus can include: a receiving module 81, configured to receive a payment instruction sent by a first user by scanning an order QR code, where the order QR code is a QR code generated based on a first order corresponding to a target product, and the first order is generated based on a purchase operation performed by a second user for the target product; a setting module 82, configured to set the first order to an occupied state, where a payment instruction of a user other than the first user is rejected to be executed when the first order is in the occupied state; a creation module 83, configured to create a second order of the first user based on an order identifier of the first order in the occupied state; and a third-party payment module 84, configured to perform a payment operation based on the second order.

Figure 9:
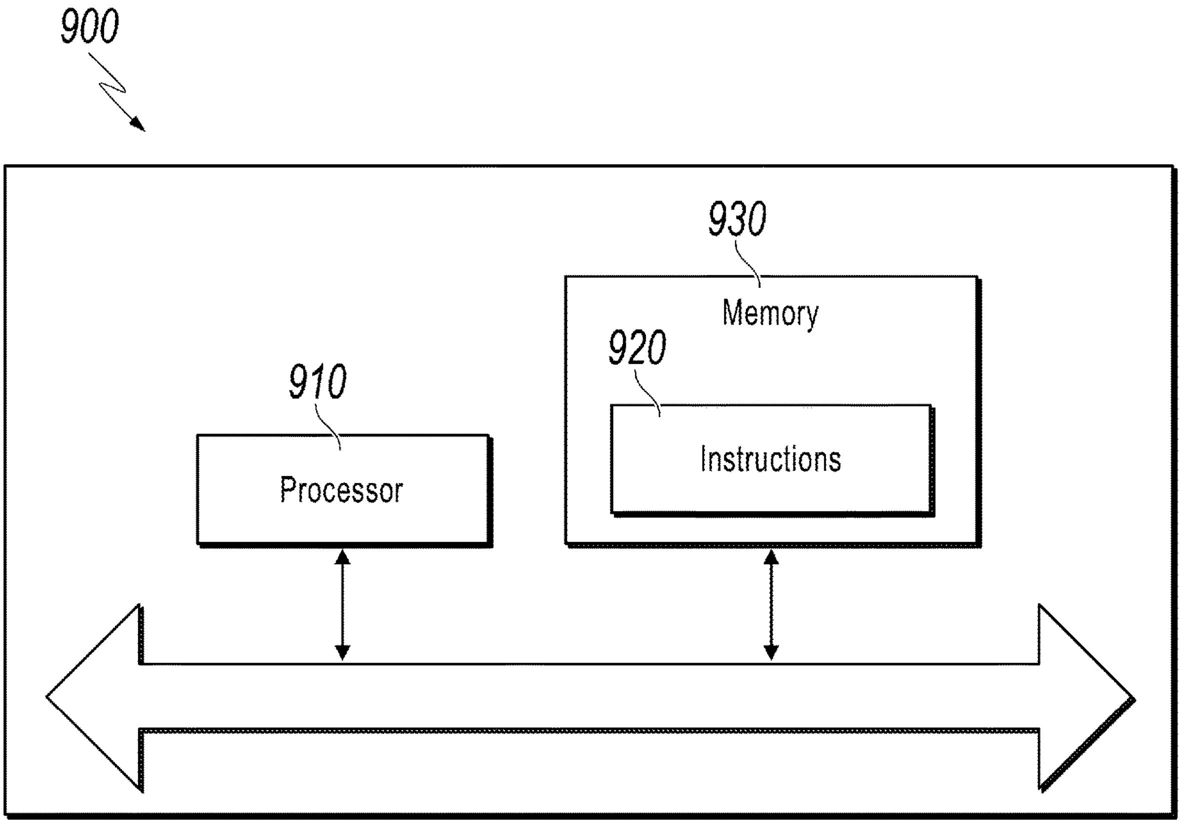
FIG. 9 is a schematic diagram illustrating a structure of an electronic device according to one or more embodiments of this specification.

FIG. 9 is a schematic diagram illustrating a structure of an electronic device corresponding to FIG. 2 according to one or more embodiments of this specification. As shown in FIG. 8, an electronic device 900 can include at least one processor 910 and a memory 930 communicatively connected to the at least one processor. The memory 930 stores instructions 920 that can be executed by the at least one processor 910. The instructions are executed by the at least one processor 910, so that the at least one processor 910 can receive a payment instruction sent by a first user by scanning an order QR code, where the order QR code is generated based on a first order corresponding to a target product, and the first order is generated based on a purchase operation performed by a second user for the target product; set the first order to an occupied state, where a payment instruction of a user other than the first user is rejected to be executed when the first order is in the occupied state; create a second order of the first user based on an order identifier of the first order in the occupied state; and perform a payment operation based on the second order.

The embodiments in this specification are described in a progressive way. For same or similar parts of the embodiments, references can be made to the embodiments mutually. Each embodiment focuses on a difference from other embodiments. Particularly, the payment apparatus shown in FIG. 7 is briefly described because of being basically similar to the method embodiments. For related parts, references can be made to some descriptions in the method embodiments.

In the 1990*s*, whether a technical improvement is a hardware improvement (for example, an improvement to a circuit structure, such as a diode, a transistor, or a switch) or a software improvement (an improvement to a method process) can be clearly distinguished. However, as technologies develop, current improvements to many method processes can be considered as direct improvements to hardware circuit structures. A designer usually programs an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, nowadays, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the advanced Boolean expression language (ABEL), the Altera hardware description language (AHDL), Confluence, the Cornell university programming language (CUPL), HDCal, the java hardware description language (JHDL), Lava, Lola, MyHDL, PALASM, and the ruby hardware description language (RHDL). The very-high-speed integrated circuit hardware description language (VHDL) and Verilog are most commonly used at present. A person skilled in the art should also understand that a hardware circuit that implements a logical method process can be readily obtained once the method process is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus for implementing various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a certain function. A typical implementation device is a computer. Specifically, for example, the computer can be a personal computer, a laptop computer, a cellular phone, a camera phone, a smartphone, a personal digital assistant, a media player, a navigation device, an e-mail device, a game console, a tablet computer, a wearable device, or any combination of these devices.

For ease of description, when the above-mentioned apparatus is described, the apparatus is divided into various units based on functions for separate description. Certainly, when this application is implemented, the functions of the units can be implemented in one or more pieces of software and/or hardware.

A person skilled in the art should understand that the embodiments of this specification can be provided as methods, systems, or computer program products. Therefore, this application can use a form of hardware only embodiments, software only embodiments, or embodiments with a combination of software and hardware. Moreover, this application can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to the embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the other programmable data processing device generate an apparatus for implementing a specific function in one or more processes in the flowcharts and/or in one or more blocks in the block diagrams.

These computer program instructions can be stored in a computer-readable memory that can instruct the computer or the other programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more central processing units (CPU), input/output interfaces, network interfaces, and memories.

The memory can include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

It should be further noted that the terms "include" and "comprise" or their any other variants are intended to cover a non-exclusive inclusion, so that a process, method, product or device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product, or device that includes the element.

A person skilled in the art should understand that the embodiments of this application can be provided as methods, systems, or computer program products. Therefore, this application can use a form of hardware only embodiments, software only embodiments, or embodiments with a combination of software and hardware. Moreover, this application can use a form of a computer program product that is implemented on one or more computer-usable storage media (including but not limited to a disk memory, a CD-ROM, an optical memory, etc.) that include computer-usable program code.

This application can be described in the general context of computer-executable instructions executed by a computer, for example, a program module. Generally, the program module includes a routine, a program, an object, a component, a data structure, etc. executing a specific task or implementing a specific abstract data type. This application can be alternatively practiced in distributed computing environments. In these distributed computing environments, tasks are performed by remote processing devices that are connected through a communications network. In the distributed computing environments, the program module can be located in local and remote computer storage media including storage devices.

The above-mentioned descriptions are merely embodiments of this application, and are not intended to limit this application. A person skilled in the art can make various changes and variations to this application. Any modification, equivalent replacement, improvement, etc. made without departing from the spirit and principle of this application shall fall within the scope of the claims in this application.

What is claimed is:

1. A computer-implemented method for payment, comprising:

receiving, by one or more processors of a service platform, an order QR code sent from a second electronic device to a first electronic device;

receiving, by the one or more processors of the service platform, a payment instruction sent by the first electronic device in response to the first electronic device scanning the order QR code, wherein the order QR code is generated based on a first order corresponding to a target product, and the first order is generated based on a purchase operation performed by the second electronic device for the target product;

determining, by the one or more processors of the service platform, that a data row, in a database, that the first order is stored in is not locked;

in response to determining that the data row is not locked, setting, by the one or more processors of the service platform, the first order to an occupied state by implementing a database row lock to lock the data row, wherein the database row lock allows only the first electronic device to perform a payment operation on the first order, and wherein a payment instruction of at least one of the second electronic device or a third electronic device is rejected from being executed in response to determining the first order is in the occupied state due to an inability of the at least one of the second electronic device or the third electronic device to implement the database row lock;

creating, by the one or more processors of the service platform, a second order corresponding to the first electronic device based on an order identifier of the first order;

performing, by the one or more processors of the service platform, the payment operation based on sending a payment code of the second order from the service platform to a unified payment platform; and unlocking, by the one or more processors of the service platform, the data row after an acceptance message returned by the unified payment platform is received.

2. The computer-implemented method of claim 1, further comprising:

determining that the data row, in the database, that the first order is stored in is locked after a predetermined waiting time interval in response to determining that the data row is locked; and determining that the first order is in the occupied state in response to determining that the data row, in the database, that the first order is stored in is locked after the predetermined waiting time interval.

3. The computer-implemented method of claim 1, further comprising:

determining a current time point and determining a non-occupiable time point, wherein the non-occupiable time point is set in response to receiving a payment instruction at a previous time; and determining that the first order is not in the occupied state in response to determining that the current time point is not earlier than the non-occupiable time point.

4. The computer-implemented method of claim 1, further comprising sending prompt information indicating that the first order is being processed to the first electronic device in response to determining that the data row, in the database, that the first order is stored in is locked.

5. The computer-implemented method of claim 1, wherein setting the first order to the occupied state, comprises:

setting a non-occupiable time point to a sum of a current time point and a predetermined non-occupiable time parameter, wherein the non-occupiable time point is used to represent a time point that the payment instruction of at least one of the second electronic device or the third electronic device can be executed at.

6. The computer-implemented method of claim 1, wherein, before creating the second order corresponding to the first electronic device based on the order identifier of the first order in the occupied state:

determining a current time point and determining a non-payable time point; and determining that the first order is not in a payment process in response to determining that the current time point is not earlier than the non-payable time point, wherein creating the second order of the first electronic device based on the order identifier of the first order in the occupied state can be performed in response to determining that the first order is not in the payment process.

7. The computer-implemented method of claim 6, comprising: determining that the first order is in the payment process in response to determining that the current time point is earlier than the non-payable time point; and sending, to the first electronic device, prompt information indicating that the first order is being paid for.

8. The computer-implemented method of claim 1, wherein, before creating the second order corresponding to the first electronic device based on the order identifier of the first order in the occupied state, comprises:

determining that the first order is not in a payable state in response to determining that the first order has been paid for; or determining that the first order is in the payable state in response to determining that the first order is not paid for, wherein the second order of the first electronic device can be created based on the order identifier of the first order in the occupied state in response to determining that the first order is in the payable state.

9. The computer-implemented method of claim 8, comprising:

sending, to the first electronic device, a prompt message indicating that the first order has been paid for in response to determining that the first order is not in the payable state.

10. The computer-implemented method of claim 1, wherein, before creating the second order corresponding to the first electronic device based on the order identifier of the first order in the occupied state:

determining that the first order is in a payable state in response to determining that a transaction corresponding to the first order is in an unclosed state; or determining that the first order is not in the payable state in response to determining that the transaction corresponding to the first order is in a closed state.

11. The computer-implemented method of claim 10, comprising:

sending, to the first electronic device, a prompt message indicating that the first order cannot be paid for in response to determining that the first order is not in the payable state.

12. The computer-implemented method of claim 1, wherein performing the payment operation based on the second order, comprises:

sending the payment code of the second order to the unified payment platform, wherein the unified payment platform can generate payment redirect page address information based on the payment code of the second order and payment platform information of an application used by the first electronic device to scan the order QR code, and send the payment redirect page address information to the application, so that the first electronic device performs the payment operation in a payment interface popped up by the application based on the payment redirect page address information.

13. The computer-implemented method of claim 1, comprising:

setting the first order to a paid state in response to determining that a payment is successfully performed by the first electronic device.

14. The computer-implemented method of claim 1, comprising:

obtaining a corresponding cancelation time point that the first electronic device cancels the payment operation at in response to determining that the first electronic device cancels the payment operation; and setting a non-payable time point to the corresponding cancelation time point in response to determining that the corresponding cancelation time point is earlier than the non-payable time point.

15. The computer-implemented method of claim 1, wherein the order identifier of the first order has a mapping relationship with an order identifier of the second order.

16. A non-transitory, computer-readable medium storing one or more instructions executable by a computer system to perform one or more operations, comprising:

receiving, by one or more processors of a service platform, an order QR code sent from a second electronic device to a first electronic device;

receiving, by the one or more processors of the service platform, a payment instruction sent by the first electronic device in response to the first electronic device scanning the order QR code, wherein the order QR code is generated based on a first order corresponding to a target product, and the first order is generated based on a purchase operation performed by the second electronic device for the target product;

determining, by the one or more processors of the service platform, that a data row, in a database, that the first order is stored in is not locked;

in response to determining that the data row is not locked, setting, by the one or more processors of the service platform, the first order to an occupied state by implementing a database row lock to lock the data row, wherein the database row lock allows only the first electronic device to perform a payment operation on the first order, and wherein a payment instruction of at least one of the second electronic device or a third electronic device is rejected from being executed in response to determining the first order is in the occupied state due to an inability of the at least one of the second electronic device or the third electronic device to implement the database row lock;

creating, by the one or more processors of the service platform, a second order corresponding to the first electronic device based on an order identifier of the first order;

performing, by the one or more processors of the service platform, the payment operation based on sending a payment code of the second order from the service platform to a unified payment platform; and unlocking, by the one or more processors of the service platform, the data row after an acceptance message returned by the unified payment platform is received.

17. A computer-implemented system for payment, comprising:

one or more computers; and one or more computer memory devices interoperably coupled with the one or more computers and having tangible, non-transitory, machine-readable media storing one or more instructions that, when executed by the one or more computers, perform one or more operations, comprising:

receiving, by the one or more computers, an order QR code sent from a second electronic device to a first electronic device;

receiving, by the one or more computers, a payment instruction sent by the first electronic device in response to the first electronic device scanning the order QR code, wherein the order QR code is generated based on a first order corresponding to a target product, and the first order is generated based on a purchase operation performed by the second electronic device for the target product;

determining, by the one or more computers, that a data row, in a database, that the first order is stored in is not locked;

in response to determining that the data row is not locked, setting, by the one or more computers, the first order to an occupied state by implementing a database row lock to lock the data row, wherein the database row lock allows only the first electronic device to perform a payment operation on the first order, and wherein a payment instruction of at least one of the second electronic device or a third electronic device is rejected from being executed in response to determining the first order is in the occupied state due to an inability of the at least one of the second electronic device or the third electronic device to implement the database row lock;

creating, by the one or more computers, a second order corresponding to the first electronic device based on an order identifier of the first order;

performing, by the one or more computers, the payment operation based on sending a payment code of the second order from a service platform to a unified payment platform; and unlocking, by the one or more computers, the data row after an acceptance message returned by the unified payment platform is received.

18. The computer-implemented system of claim 17, wherein the operations further comprise:

determining that the data row, in the database, that the first order is stored in is locked after a predetermined waiting time interval in response to determining that the data row is locked; and determining that the first order is in the occupied state in response to determining that the data row, in the database, that the first order is stored in is locked after the predetermined waiting time interval.

19. The computer-implemented system of claim 17, wherein the operations further comprise:

determining a current time point and determining a non-occupiable time point, wherein the non-occupiable time point is set in response to receiving a payment instruction is received at a previous time; and determining that the first order is not in the occupied state in response to determining that the current time point is not earlier than the non-occupiable time point.

20. The computer-implemented system of claim 17, wherein the operations further comprise sending prompt information indicating that the first order is being processed to the first electronic device in response to determining that the data row, in the database, that the first order is stored in is locked.

* * * * *